Feb. 24, 1931. C. MORTENSEN 1,793,631
DAIRY APPARATUS
Filed June 5, 1928 3 Sheets-Sheet 1

Feb. 24, 1931.    C. MORTENSEN    1,793,631
DAIRY APPARATUS
Filed June 5, 1928    3 Sheets-Sheet 2

Cornelius Mortensen, Inventor

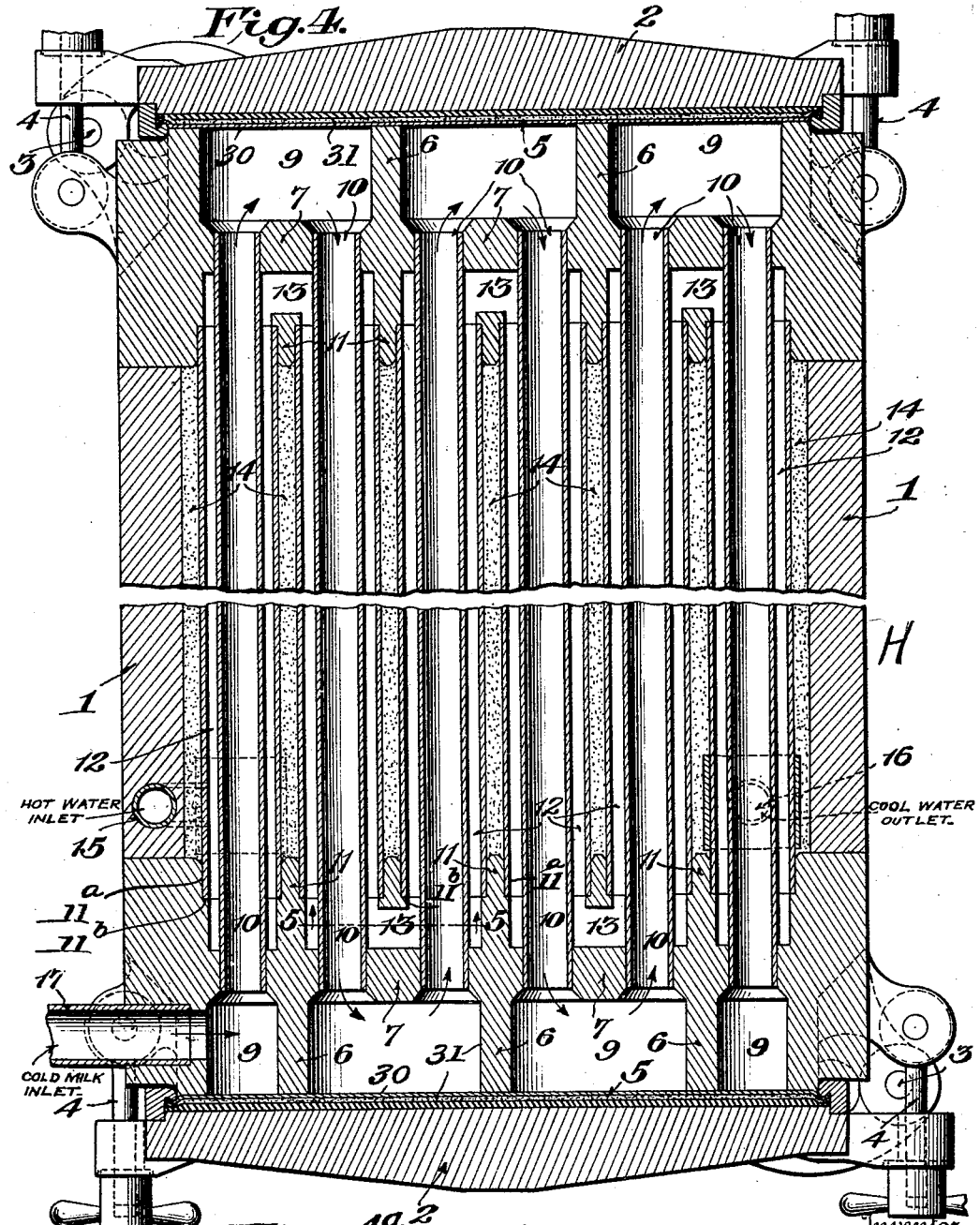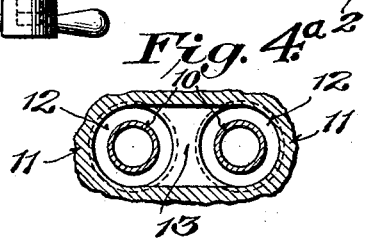

Patented Feb. 24, 1931

1,793,631

UNITED STATES PATENT OFFICE

CORNELIUS MORTENSEN, OF LOUISVILLE, KENTUCKY

DAIRY APPARATUS

Application filed June 5, 1928. Serial No. 283,071.

This invention relates to dairy apparatus, and more particularly to a novel construction and arrangement primarily utilized as a heater for raising the temperature of the raw milk before it is transferred to the holders to be held for the required pasteurizing period.

Heretofore, it has been the general practice in the use of heaters of the internal tube type to utilize a construction which was more or less of the ordinary steam boiler construction involving the use of single milk tubes with a body of hot water surrounding all of the tubes and being held in the shell or casing of the apparatus. In heaters of this type steam was fed into the bottom of the shell to heat the static water, and milk was fed into the bottom tubes and taken out at the top. This arrangement has the disadvantage of the cold incoming milk being subjected to the influence of the water in the bottom of the tank which is steam heated, thereby not only subjecting the milk initially to the highest heat but also rendering it difficult to keep the temperature of the water at proper height throughout the casing because of the cooling effect of the incoming milk on water at its source of heat. Furthermore, it is difficult to keep the water at opposite ends of the boiler at correct temperature because of the lack of circulation lengthwise of the boiler shell.

The raising of the milk to the proper temperature should necessarily be very accurately controlled not only for the reason that the temperature must be elevated sufficiently to kill germ life but also the temperature must not be high enough to bake or cook the milk. Therefore, in order to obtain a heater capable of properly and adequately heating the milk according to the speed of operation of the milk pump, it will be apparent that it is a very difficult matter to maintain in a heater of the type described, a large body of water surrounding all the milk tubes at a proper temperature throughout.

Also, in the event of failure of the pump causing the forced circulation of the water the present invention provides means for immediately relieving the heater of the hot water to prevent the baking of the milk which would be trapped in the heater.

Accordingly, the present invention aims to overcome the objections heretofore encountered in connection with heaters of the type referred to by providing a construction which permits of the forced circulation of the milk as well as the forced circulation of the heating medium about and along the milk tubes, the flow of the milk and heating fluid each being in opposite directions and subject to accurate control.

A further object of the invention is to provide a thoroughly sanitary construction which may be easily sterilized, and which when in use avoids the formation of foam which is objectionable because the film of milk surrounding the air bubbles in foam cannot be raised or held to the same temperature as the body of the milk.

With the above objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings in which Fig. 1 is a side elevation of the apparatus, illustrating more particularly the arrangement of the water supply.

Fig. 4 is a plan section on line 4—4 of Fig. 2.

Figure 1:
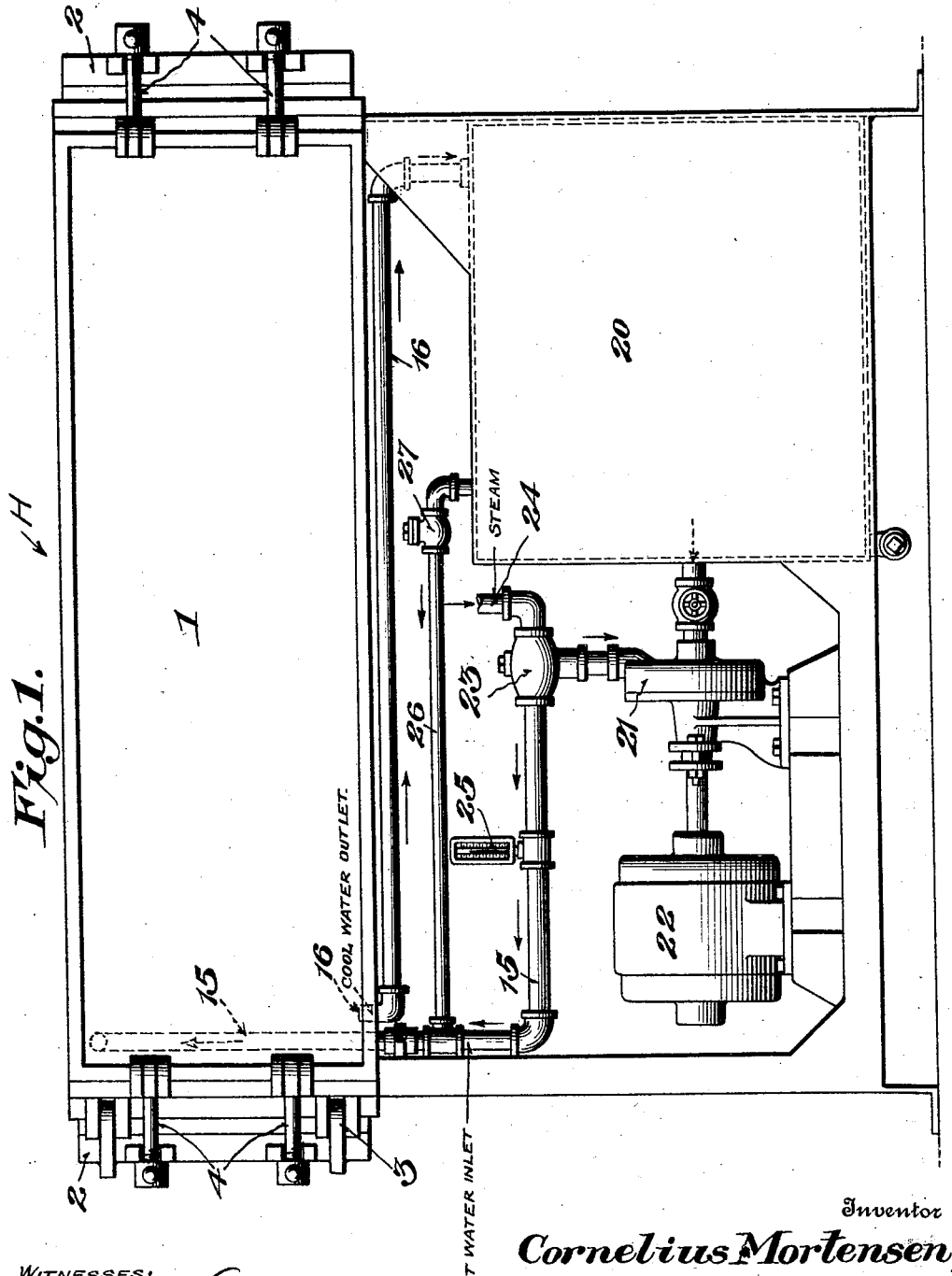

Fig. 4ª is a detail section showing the water transfer passage from one tube to another.

Similar reference characters designate corresponding parts throughout the several figures of the drawings.

In carrying the present invention into effect it is proposed to provide for the forced circulation of both the milk and the heating medium in opposite directions, the said heating medium being water heated by an admixture of steam, the milk being introduced at the bottom and the hot water at the top, whereby the milk is gradually raised to the desired temperature as it passes upwardly through the heater, being first subjected to the heating effect of water which has lost some of its initial heat. The hot water, being under forced circulation, is at no time stationary in the apparatus, so that no "dead water" occurs, and should the pump, which circulates the water stop, the hot water in the apparatus immediately drains off, whereby no baking or cooking of the milk can take place.

Referring to the drawings the heater proper designated generally as H includes a casing 1 which may be a rectangular structure, containing headers 7 for the tubes and closed at its ends by heavy doors 2, hinged at 3 to the casing 1. These doors are held closed by swinging bolts 4 and suitable yielding packing 5 on the inside of the doors insures tight joints.

The milk tubes 10 are secured in the headers 7 and are surrounded by the heating medium jackets or water tubes 12, which are of less length than the milk tubes and are engaged snugly at their ends in openings 11$^a$ suitably formed in the inner faces of the headers 7, said openings being of stepped or counterbored formation to provide shoulders 11$^b$ against which the ends of the tubes 12 seat to prevent endwise movement of said tubes. Alternate of the walls 11 between adjacent openings 11$^a$ in each header are apertured as indicated at 13 to permit flow of the water from one water jacket to the next, the apertures at the back of the casing being staggered relatively to those at the front whereby water in its circulation through the tubes 12 is caused to follow a tortuous path first in a given direction through one tube and then in an opposite direction through the next tube.

In the outer face of each header 7 are formed elongated recesses or compartments 9 providing communication between the ends of adjacent milk tubes 10, said recesses or compartments 9 being separated by walls 6, and the recesses or compartments at the back of the casing being staggered relatively to those at the front of the casing whereby, like the flow of water through the tubes 12, the milk also is caused to follow a tortuous path first in a given direction through one tube 10 and then in an opposite direction through the next tube.

Figure 2:
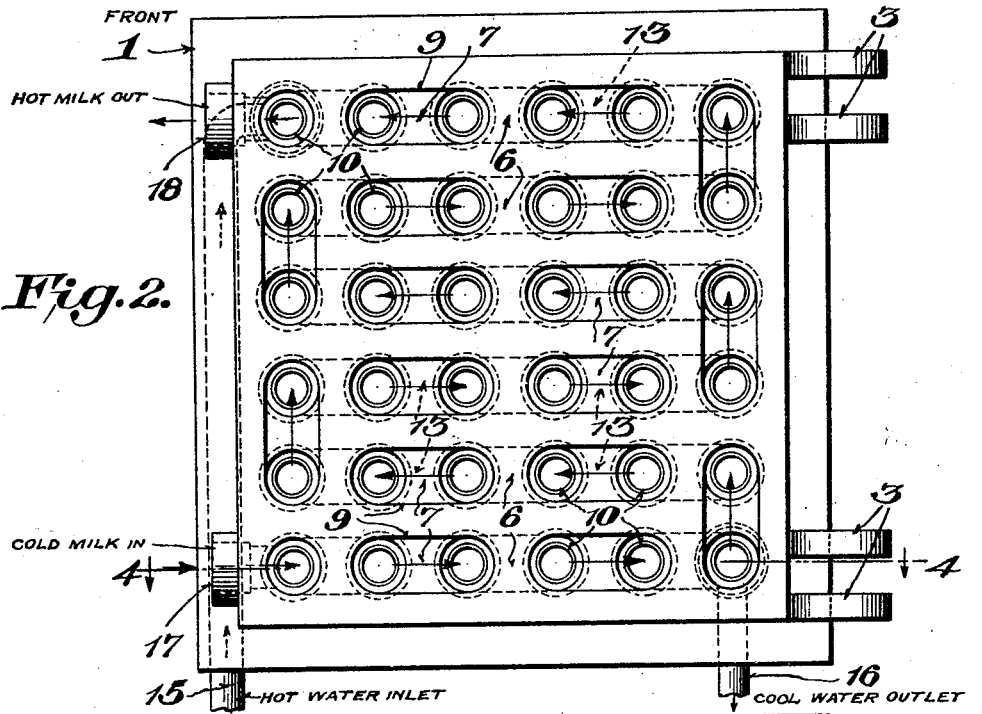
Fig. 2 is an end elevation of the front end of the heater with the door or closing head removed.
Figure 3:
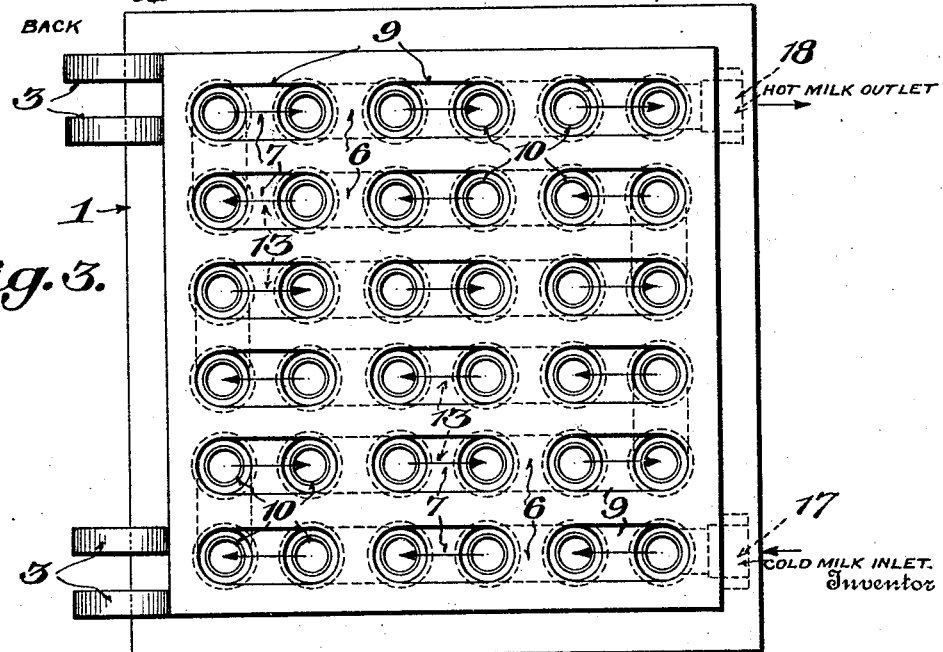
Fig. 3 is a similar view of the rear end of the heater.

The hot water, entering through pipe 15 near the top of the casing, flows successively through the jackets in the uppermost horizontal tier, then in the reverse direction through the tier next below, and so on, until it finally issues through the outlet pipe 16 at the bottom. At the same time, the milk, entering the front end at the bottom through pipe 17, flows through the first tube 10, shown at the left of Fig. 4, into the compartment 9 at the rear end, thence back through the second tube 10 in said bottom tier, through the compartment 9 at the front, and so on, back and forth through the tubes of said tier until it reaches the last compartment 9 at the front, which communicates with the tube outlet 18, as indicated by the arrows in Figs. 2 and 3.

The milk is fed by a pump, not shown, and there is, consequently, a constant forced countercurrent flow of the two liquids, the milk passing upwardly and the water downwardly through the heater.

Referring now to Fig. 1, the circulation of the water is from tank 20 into centrifugal pump 21, from which it passes to a stem and water mixer 23, supplied with steam through pipe 24. The hot water then enters the heater through pipe 15, and, after following the tortuous path described, returns without some of its heat through pipe 16 to the tank 20. There is a thermometer 25 in the inlet pipe 15, and 26 is an air inlet pipe, provided with a check valve 27, adapted to be closed by the pressure of the circulating water and adapted to open freely when the pressure of the circulating water thereagainst is relieved. When this valve opens under a reduction in said pressure, owing to the stoppage of the pump 21, for example, it admits air into the heater through pipe 26, which permits the hot water to drain out through pipe 16, so that the milk in the heater will not be overheated or cooked.

The packing shown at 14 is asbestos, but should the apparatus be used for cooling instead of heating, cork or the like might be used in lieu of the asbestos packing. That is to say, while the present apparatus is primarily intended to be used as a milk heater, nevertheless the double tube construction also permits of the use of the device as a cooler, cold water being used in the jacket surrounding the milk tubes instead of hot water.

From the foregoing, it will be apparent that the novel and distinctive feature of the present invention resides in the provision of a construction involving jacketed milk tubes which permits of accurately controlling the temperature of the milk, together with the feature of means for automatically draining the tubes constituting the jackets for the milk tubes to prevent overheating of the milk in event that circulation ceases. Also, the invention contemplates the use of doors constituting the ends of the cabinet or casing which do not require absorbent gaskets or the equivalent, the same being unsanitary. By using a sheet of thin copper 30 to seal the compartments which establish communication between the tubes, the said copper being backed up by a yielding base 31 so that under the pressure of the cover fastenings a tight closure is formed.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. In a device of the class described, a casing, a plurality of tubes for carrying the fluid to be treated and adapted to communicate to provide a continuous fluid circuit, jacket tubes surrounding the first mentioned tubes and providing a continuous circuit for a temperature controlling medium, means for supplying fluid to the first mentioned tubes from the bottom thereof, means for supplying fluid to the second mentioned tubes from the top thereof, and means for automatically draining the jacket tubes when the means for supplying fluid thereto ceases operation.

2. In apparatus of the type described, means to continuously force a stream of water through a series of jacket tubes in counter current to a continuous flow of milk through a series of tubes, each surrounded by one of said jacket tubes, and means to automatically admit air into said jacket tubes to permit the water to drain out of the same when said water forcing means becomes ineffective.

3. In apparatus of the class described, means providing two liquid passages, one surrounding the other, a pump for forcing liquid through at least one of said passages, and means preventing air from entering said latter passage during operation of said pump and effective when operation of said pump ceases to admit air to said passage to permit liquid to drain therefrom.

4. In apparatus of the class described, means providing two liquid passages, one surrounding the other, a pump for forcing liquid through at least one of said passages, and a check valve connected with said latter passage near the liquid entrance end thereof adapted to be maintained closed by the pressure of the liquid in said passage when said pump is in operation and adapted to open to admit air to said passage to permit liquid to drain therefrom when operation of the pump ceases.

In testimony whereof I hereunto affix my signature.

CORNELIUS MORTENSEN.